United States Patent [19]
Feher

[11] Patent Number: 5,595,016
[45] Date of Patent: Jan. 21, 1997

[54] MOTION RESISTANT FREELINE BOBBER

[76] Inventor: John Feher, R.D. #1, Box 222A, Adena, Ohio 43901

[21] Appl. No.: 385,891

[22] Filed: Feb. 9, 1995

[51] Int. Cl.$^6$ .................................................. A01K 93/00
[52] U.S. Cl. ................................... 43/44.87; 43/44.92
[58] Field of Search ........................... 43/44.87, 44.92, 43/44.93, 44.94, 44.95

[56] References Cited

U.S. PATENT DOCUMENTS

| | | | |
|---|---|---|---|
| 2,539,234 | 1/1951 | Dobkowski | 43/44.93 |
| 2,547,308 | 4/1951 | Dean | 43/44.87 |
| 3,800,461 | 4/1974 | Jacobi | 43/44.92 |
| 4,138,793 | 2/1979 | Kellie | 43/44.92 |
| 4,359,836 | 11/1982 | Yuji | 43/44.87 |
| 4,748,764 | 6/1988 | Hammons | 43/44.87 |
| 4,858,369 | 8/1989 | Collins | 43/44.87 |

FOREIGN PATENT DOCUMENTS

| | | | |
|---|---|---|---|
| 631178 | 11/1961 | Canada | 43/44.92 |
| 2668891 | 5/1992 | France | 43/44.94 |

Primary Examiner—Kurt Rowan

[57] ABSTRACT

A bobber for buoyantly supporting a fishing line and resisting motion of the line towards a fishing reel. The inventive device includes a buoyant resistance assembly for floating and resisting motion in water. A coupling assembly depends from the buoyant resistance assembly for slidably coupling to a fishing line to support a casted fishing line within a body water and resist motion of the line towards an associated fishing reel.

4 Claims, 3 Drawing Sheets

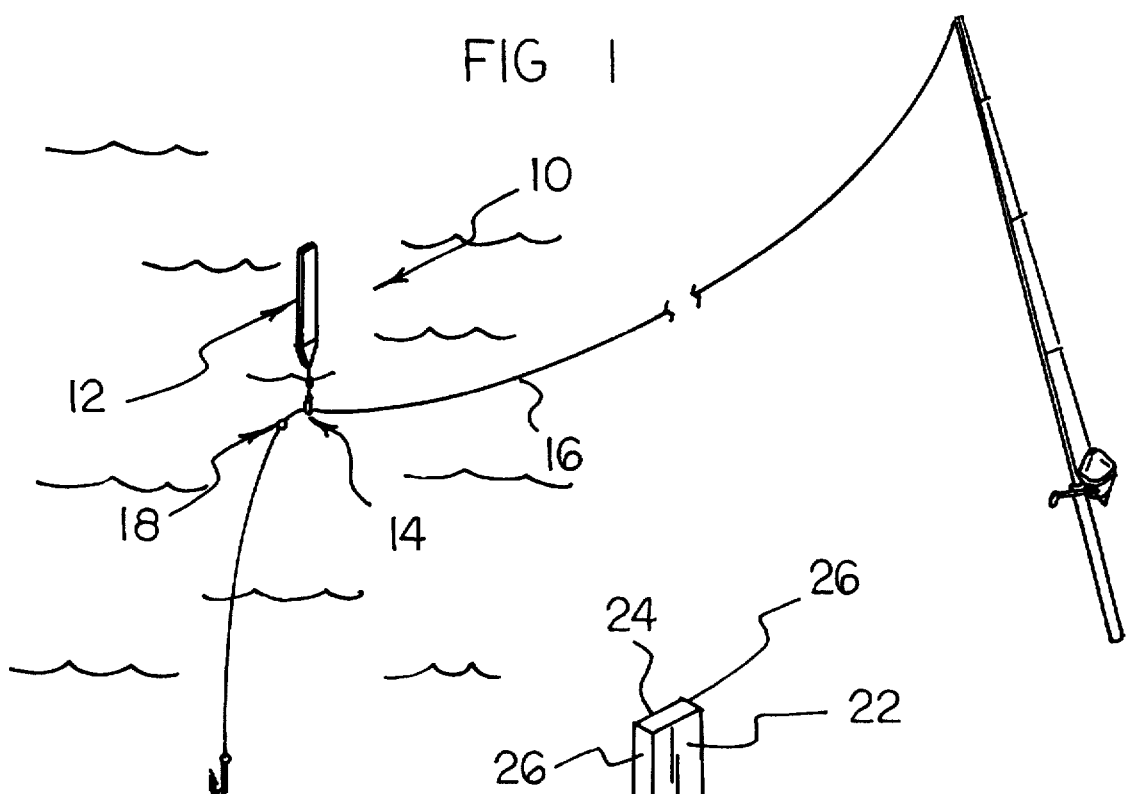
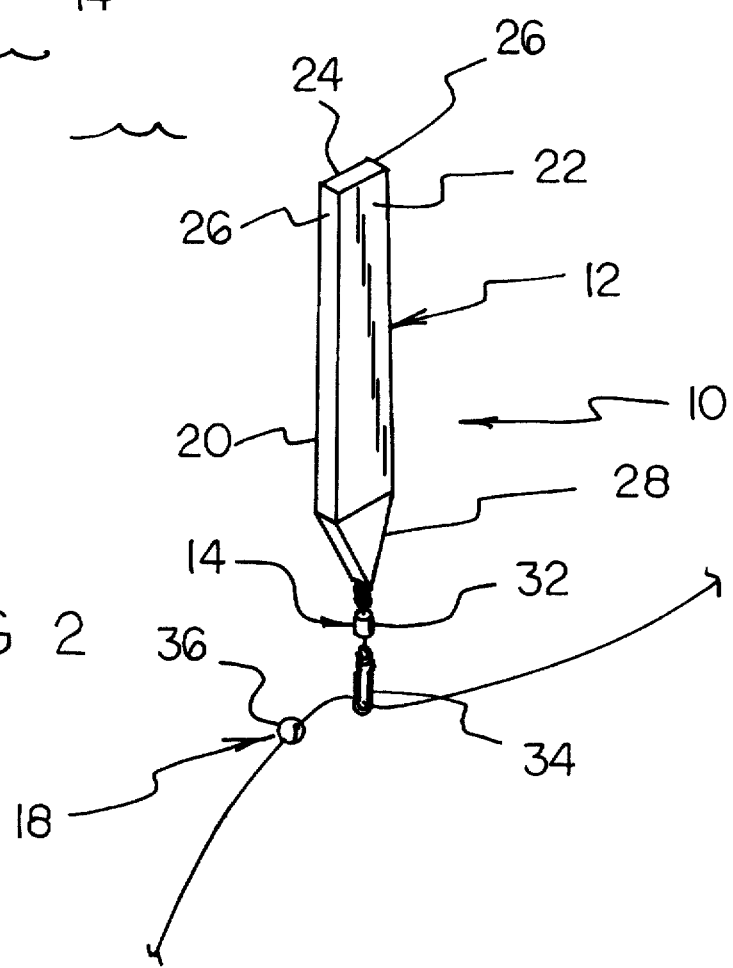
FIG 1
FIG 2

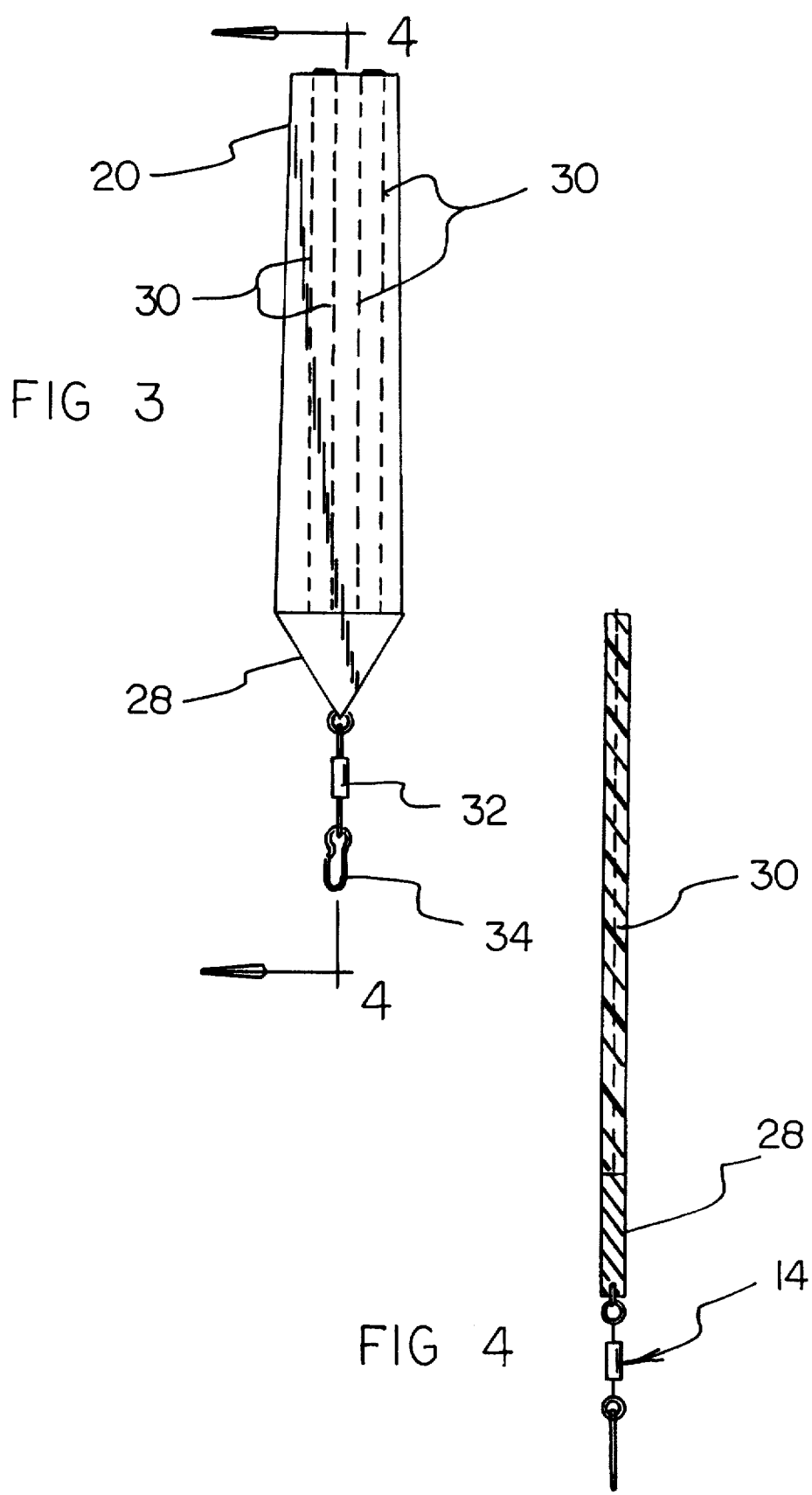

MOTION RESISTANT FREELINE BOBBER

BACKGROUND OF THE INVENTION

1. Field of the Invention

The present invention relates to fishing float structures and more particularly pertains to a motion resistant freeline bobber for buoyantly supporting a fishing line and resisting motion of the line towards a fishing reel.

2. Description of the Prior Art

The use of fishing float structures is known in the prior art. More specifically, fishing float structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing float structures include U.S. Pat. No. 4,449,318; U.S. Pat. No. 4,574,515; U.S. Pat. No. 4,571,874; U.S. Pat. No. 4,144,666; U.S. Pat. No. 4,516,349; and U.S. Pat. No. 4,845,885.

While these devices fulfill their respective, particular objectives and requirements, the aforementioned patents do not disclose a motion resistant freeline bobber for buoyantly supporting a fishing line and resisting motion of the line towards a fishing reel which includes a buoyant resistance assembly for floating and resisting motion in water, and a coupling assembly depending from the buoyant resistance assembly for slidably coupling to a fishing line.

In these respects, the motion resistant freeline bobber according to the present invention substantially departs from the conventional concepts and designs of the prior art, and in so doing provides an apparatus primarily developed for the purpose of buoyantly supporting a fishing line and resisting motion of the line towards a fishing reel.

SUMMARY OF THE INVENTION

In view of the foregoing disadvantages inherent in the known types of fishing float structures now present in the prior art, the present invention provides a new motion resistant freeline bobber construction wherein the same can be utilized for buoyantly supporting a fishing line and resisting motion of the line towards a fishing reel. As such, the general purpose of the present invention, which will be described subsequently in greater detail, is to provide a new motion resistant freeline bobber apparatus and method which has many of the advantages of the fishing float structures mentioned heretofore and many novel features that result in a motion resistant freeline bobber which is not anticipated, rendered obvious, suggested, or even implied by any of the prior art fishing float structures, either alone or in any combination thereof.

To attain this, the present invention generally comprises a bobber for buoyantly supporting a fishing line and resisting motion of the line towards a fishing reel. The inventive device includes a buoyant resistance assembly for floating and resisting motion in water. A coupling assembly depends from the buoyant resistance assembly for slidably coupling to a fishing line to support a casted fishing line within a body water and resist motion of the line towards an associated fishing reel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motion resistant freeline bobber apparatus and method which has many of the advantages of the fishing float structures mentioned heretofore and many novel features that result in a motion resistant freeline bobber which is not anticipated, rendered obvious, suggested, or even implied by any of the prior art fishing float structures, either alone or in any combination thereof.

It is another object of the present invention to provide a new motion resistant freeline bobber which may be easily and efficiently manufactured and marketed.

It is a further object of the present invention to provide a new motion resistant freeline bobber which is of a durable and reliable construction.

An even further object of the present invention is to provide a new motion resistant freeline bobber which is susceptible of a low cost of manufacture with regard to both materials and labor, and which accordingly is then susceptible of low prices of sale to the consuming public, thereby making such motion resistant freeline bobbers economically available to the buying public.

Still yet another object of the present invention is to provide a new motion resistant freeline bobber which provides in the apparatuses and methods of the prior art some of the advantages thereof, while simultaneously overcoming some of the disadvantages normally associated therewith.

Still another object of the present invention is to provide a new motion resistant freeline bobber for buoyantly supporting a fishing line and resisting motion of the line towards a fishing reel.

Yet another object of the present invention is to provide a new motion resistant freeline bobber which includes a buoyant resistance assembly for floating and resisting motion in water, and a coupling assembly depending from the buoyant resistance assembly for slidably coupling to a fishing line.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a motion resistant freeline bobber according to the present invention in use.

FIG. 2 is an enlarged isometric illustration of the present invention.

FIG. 3 is a front elevation view thereof.

FIG. 4 is a cross sectional view taken along line 4—4 of FIG. 3.

DESCRIPTION OF THE PREFERRED EMBODIMENT

Figure 5:
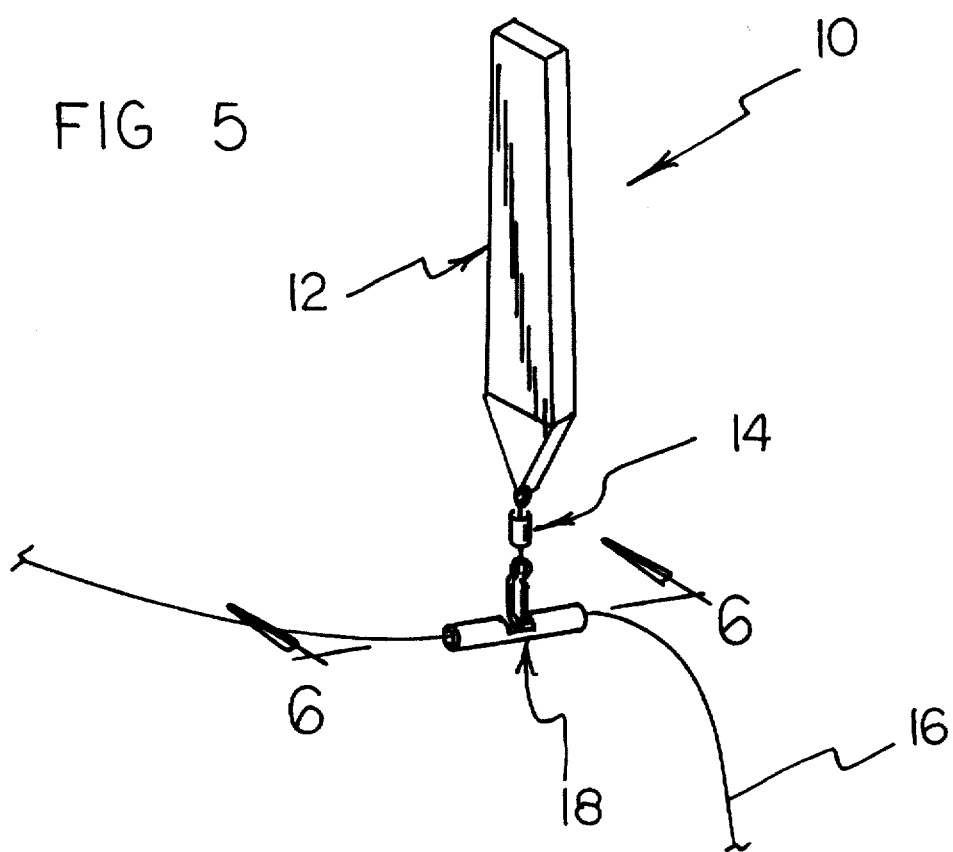
FIG. 5 is an isometric illustration of the present invention including an alternative form of a limiting means.

With reference now to the drawings, and in particular to FIGS. 1-6 thereof, a new motion resistant freeline bobber embodying the principles and concepts of the present invention and generally designated by the reference numeral 10 will be described.

More specifically, it will be noted that the motion resistant freeline bobber 10 comprises a buoyant resistance means 12 for floating and resisting motion in a body of water, as shown in FIG. 1 of the drawings. A coupling means 14 is pivotally secured to the buoyant resistance means 12 for slidably coupling to a filament line 16 of an unlabeled fishing rod. A limiting means 18 can be provided for use with the present invention 10 for securing to the filament line 16 to limit a traveling of the coupling means 14 along the line 16. By this structure, the present invention 10 can be utilized during a fishing procedure to support the filament line 16 at a given depth within the body of water and at a given distance from the fishing apparatus, whereby "jigging" or repeated vertical oscillation of a free distal end of the filament line 16 can be accomplished.

As best illustrated in FIGS. 2 through 4, it can be shown that the buoyant resistance means 12 according to the present invention 10 preferably comprises a buoyant member 20 formed of a substantially buoyant material relative to water, such as styrofoam, or other materials having a specific gravity less than one. The buoyant member 20 is shaped so as to define a substantially planar front face 22 spaced from a substantially planar rear face 24, with lateral faces 26 extending substantially orthogonally between the front and rear faces 22 and 24 to define a substantially rectangular shape of the buoyant member 20. A balancing weight 28 is secured to a lower end of the buoyant member 20 and operates to cause the buoyant resistance means 12 to assume a substantially vertical orientation within a body water as shown in FIG. 1. By this structure, the front face 22 or the rear face 24 produce hydrodynamic resistance to motion of the buoyant resistance means 12 through a body of water.

As shown in FIGS. 3 and 4, the balancing weight 28 is preferably secured to the buoyant member 20 by a plurality of securing wires 30 coupled to the balancing weight 28 and extending longitudinally through the buoyant member. Such securement of the balancing weight 28 to the buoyant member 20 provides for ease of manufacturing of the device 10, as well as reinforcing of the buoyant member 20. Thus, the securing wires 30 can be tensioned to provide a compressive stress to the buoyant member 20, thereby substantially increasing strength and rigidity of the buoyant member 20.

With continuing reference to FIG. 2, it can be shown that the coupling means 14 according to the present invention 10 preferably comprises a swivel 32 pivotally mounted to the balancing weight 28 of the buoyant resistance means 12. An eye clip 34 extends from the swivel 32 for coupling to the filament line 16 of a fishing apparatus. The eye clip 34 permits free traveling or "freelining" of the filament line 16 through the coupling means 14. By this structure, the device 10 can be cast a predetermined distance from the fishing apparatus whereby a repeated tensioning and relaxing of the filament line 16 will result in a oscillating vertical movement of a free distal end of the filament 16 to which bait or other lure structure is attached. If desired, the limiting means 18 can be secured to the filament line 16 to limit travel of the filament line through the eye clip 34. To this end, the limiting means 18 is simply comprise a snapshot 36 secured to the filament line 16 on one or both sides of the eye clip 34. In other words, a first snapshot 36 can be secured between a free distal end of the filament line 16 and the eye clip 34 as shown in FIG. 2, with a second and unillustrated snapshot being securable to the filament line 16 between the eye clip 34 and the fishing apparatus.

Figure 6:
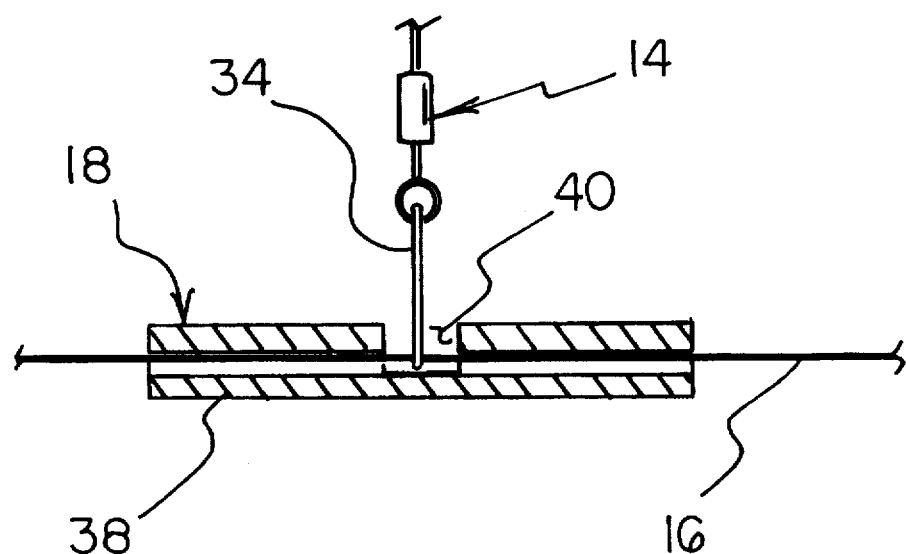
FIG. 6 is a cross sectional view taken along line 6—6 of FIG. 5.

Referring now to FIGS. 5 and 6, it can be shown that the limiting means 18 according to the present invention 10 may alternatively comprise a ductile tube 38 having a center slot 40 directed into contiguous communication with an unlabeled longitudinal bore directed through the ductile tube 38. By this structure, the filament line 16 can be fed through the longitudinal bore of the ductile tube 38, with the eye clip 34 being positionable through the center slot 40 and coupled to the filament line 16. The ductile tube 38 can then be deformed so as to frictionally engage the filament line 16 to secure the limiting means 18 to a predetermined portion of the filament line.

In use, the motion resistance freeline bobber 10 according to the present invention can be easily utilized to vertically oscillate a lure or other bait within a body of water from a distance relative to a predetermined point in the water. Because the buoyant resistance means 12 provides resistance to reeling in of the filament line 16, the bait can be vertically oscillated without unintentional horizontal traveling of the bait or lure through the body of water unless so desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing line bobber comprising:

a spherical floatation member shaped so as to define a truncated cylindrical bore extending into the spherical floatation member which is of a first diameter, the truncated cylindrical bore being in contiguous communication with the through-extending cylindrical bore, with the first diameter being substantially greater than the second diameter;

a securing boss received within truncated cylindrical bore;

a hollow hemi-spherical weight secured to a portion of the spherical floatation member so as to coextensively cover approximately one-half of the spherical floatation member;

a center wire projecting through the securing boss and through the through the through-extending cylindrical bore, the center wire being shaped so as to define an upper J-shaped end which engages a portion of the securing boss so as to preclude a passage of a first upper end of the center wire through the cylindrical bores of the spherical floatation member, the center wire continuing through the through-extending cylindrical bore of the spherical floatation member, and projecting through a center of the hemi-spherical weight, the center wire terminating in a lower J-shaped end which engages an exterior portion of the hemi-spherical weight so as to secure the weight relative to the spherical floatation member; and a line clasp secured to the swivel and adapted for engaging a fishing line.

2. The motion resistant freeline bobber of claim 1, wherein the coupling means comprises a swivel pivotally mounted to the balancing weight of the buoyant resistance means; and an eye clip extending from the swivel for coupling to a filament line, the eye clip permitting free traveling of the filament line through the coupling means.

3. The motion resistant freeline bobber of claim 2, and further comprising a limiting means for securing to a filament line to limit travel of the filament line through the eye clip.

4. The motion resistant freeline bobber of claim 3, wherein the limiting means comprises a ductile tube having a center slot directed into contiguous communication with a longitudinal bore directed through the ductile tube, wherein the filament line can be fed through the longitudinal bore of the ductile tube, with the eye clip being positionable through the center slot and couplable to the filament line, the ductile tube being deformable so as to frictionally engage the filament line to secure the limiting means to a predetermined portion of the filament line.

* * * * *